United States Patent [19]
Kreher et al.

[11] 4,430,280
[45] Feb. 7, 1984

[54] PROCESS FOR THE PRODUCTION OF MIXED GRANULATE FROM CARBON BLACK AND LIGHT FILLER

[75] Inventors: Alfons Kreher, Frankfurt; Gerhard Kühner, Hanau; Lothar Rothbühr, Hürth; Günter Türk, Hanau; Siegfried Wolff, Bornheim-Merten, all of Fed. Rep. of Germany

[73] Assignee: Degussa Aktiengesellschaft, Frankfurt, Fed. Rep. of Germany

[21] Appl. No.: 131,533

[22] Filed: Mar. 18, 1980

[30] Foreign Application Priority Data

Mar. 21, 1979 [DE] Fed. Rep. of Germany ....... 2910991

[51] Int. Cl.$^3$ .............................................. B01J 2/00
[52] U.S. Cl. ..................................... 264/117; 264/122
[58] Field of Search ................................ 264/117, 122

[56] References Cited

U.S. PATENT DOCUMENTS 3,203,819  8/1965  Steenken et al. ............... 106/307
4,166,722  9/1979  Geissler et al. ................. 264/117
4,182,736  1/1980  Gunnell .......................... 264/117

OTHER PUBLICATIONS

"Zeolite Molecular Sieves", Donald W. Beck, John Wiley & Sons, N.Y., N.Y.

Primary Examiner—James R. Hall
Attorney, Agent, or Firm—Cushman, Darby & Cushman

[57] ABSTRACT

There are produced mixed granulates of carbon black-light filler using carbon black and an aqueous suspension of a light filler, e.g. precipitated in a pin containing screw granulator.

5 Claims, No Drawings

PROCESS FOR THE PRODUCTION OF MIXED GRANULATE FROM CARBON BLACK AND LIGHT FILLER

BACKGROUND OF THE INVENTION

The invention is directed to a process for the production of mixed granulates of carbon black and light fillers in a spiked screw granulator and the product produced as well as rubber compositions containing such product.

Carbon black or light fillters are used for reinforcing natural or synthetic rubber. To simplify the addition to rubber mixtures there are also used mixtures of carbon black and light fillers, so-called "black-white mixtures". These "black-white mixtures" for example exhibit good industrial rubber properties in the production of vehicle tires. Especially good industrial rubber properties are obtained in rubber articles which are subject to a dynamic load. With the use of black-white mixtures besides it is possible to produce a high degree of filling whereby the properties of the filled polymers depending on the mixing ratios can be influenced positively in the manner aimed at.

However, there are certain difficulties in the addition of both fillers in the form of a so-called black-white mixture to the rubber mixture because during the addition of the fillers with a fixed mixing ratio from the supply bunker to the rolls or in the kneader there always exists the danger of a dissociation into the components and therewith an inexact dosaging.

It is known for better handling and for avoiding an inexact dosaging of the black-white mixture of carbon black and light filler to produce mixed granulates made of both components by mixing dry, non-pelleted carbon black into a filler cake dough of a precipitated filler until there is formed the highest possible homogeneous composition using granulating apparatus, as e.g. distributor rolls, solid rolls or drum granulators, granulating and drying (Steenken German AS No. 11 46 606 and related Steenken U.S. Pat. No. 3,203,819).

However, this process has the disadvantage that the mixed granulates obtained are shaped irregularly, relatively coarse, have poor flowability and therewith are inexactly dosageable.

The known process according to German AS No. 11 46 606 and the related Steenken U.S. patent furthermore has the disadvantage that the production of a homogeneous and definite combined mixture is only possible batchwise and with considerable apparatus and energy expense because the aqueous, pasty filter cake of precipitated filler to be mixed with the carbon black in the filter press accumulates in the form of irregular shaped, coarse lumps. The true granulation can only be carried out subsequently in a second step.

From Rothbuhr German OS No. 15 92 861 there is known a process with which powdery carbon black and air dried, powdery precipitated silica is wet shaped in a special apparatus into pellets with water which contains an adhesive and subsequently the granulate formed is dried.

Disadvantages of the known process are shown from the fact that it is only possible to granulate batchwise in special apparatus and furthermore that there is required a partial double drying of the silica. There is also known from Rothbuhr German OS No. 15 92 861 a further process which uses a spiked screw granulator.

However, it is explained in Rothbuhr German OS No. 15 92 861 that customarily used pin containing screw granulators for the production of carbon black pellets are not suited for the production of mixed granulates.

Therefore there is a need for a regular shaped, pellet shaped mixed granulate having good flowability and good dosageability produced according to a continuous, energy saving process with known apparatus.

SUMMARY OF THE INVENTION

The purpose of the invention is to develop a process for the production of mixed granulates from carbon black and light fillers by means of a pin containing screw granulator which is characterized by spraying the light filler in the form of an aqueous dispersion continuously in the pin containing screw granulator on the continuously supplied carbon black, simultaneously forming pellets of this mixture and drying the thus obtained mixed granulate.

As light fillers there can be employed silicas precipitated from alkali silicates, e.g. sodium silicate, or potassium silicate by reaction with acids, e.g. sulfuric acid or hydrochloric acid. These can, e.g. after the drying, be redispersed in water to produce an aqueous dispersion.

In a preferred form of the invention the aqueous dispersion of the precipitated silica can be produced from the filter cake of the precipitated silica by means of the known process of Brandt German OS No. 24 47 613 and related Brandt U.S. Pat. No. 4,094,771. The entire disclosure of the Brandt U.S. patent is hereby incorporated by reference and relied upon.

As light fillers there also can be employed besides precipitated silicas other fillers of natural or synthetic origin.

Usable natural fillers for example are kaolinite, clays, siliceous chalks, chalk, modified mineral fillers, zeolites, etc.

Usable synthetic fillers in addition to precipitated silica are amorphous precipitated calcium, aluminum or magnesium silicate, sodium aluminum silicate as well as zeolites of Type A, X, Y, P or sodalite.

The solid content of the filler dispersion can be between 0.5 and 60 weight %.

As carbon blacks there can be used all known types of carbon black (see Ullmann's Enzyklopädie der technischen Chemie, 3rd edition, Vol. 14 pages 793 et seq (1963)).

As spike screw granulators there can be used all of the devices of the type of spike screw pelleters known to be pelleting machines. Thus there can be used carbon black pelleting machines such as are described in Rothbuhr German Pat. No. 21 47 503 and related Rothbuhr U.S. Pat. No. 3,852,399 or Glaxner German Pat. No. 10 81 167. The entire disclosure of the Rothbuhr U.S. patent is hereby incorporated by reference and relied upon.

The advantage of the process of the invention is in the continuous procedure wherein there are employed known pin containing screw granulators without additional reconstruction.

Further advantages result from the fact that mixing and pelleting can be undertaken in a process step wherein the aqueous dispersion resulting from the production of the filler as intermediate product can be employed directly.

Through this additional energy can be saved because there is eliminated an expensive drying step.

The mixed granulates obtained are uniformly shaped and because of their pellet-like character very readily pourable. They can be well metered and excellently worked into or dispersed in rubber mixtures. Besides in using the preferred form of the invention according to Brandt German Pat. No. 24 47 613 and Brandt U.S. Pat. No. 4,094,721 they are particularly low in grit.

The mixed granulates according to the invention are low in dust and have a low degree of pellet abrasion. They are fixed in their composition and do not separate when they are added.

The compositions can comprise, consist essentially of, or consist of the materials set forth and the process can comprise, consist essentially of or consist of the steps set forth.

Unless otherwise indicated all parts and percentages are by weight.

DIN stands for German Industrial Standard.

Illustrative rubbers which can be employed include for example natural rubber, polyisoprene, butadiene-styrene copolymer, butyl rubber, ethylene-propylene-terpolymer rubber, e.g. ethylene-propylene-cyclooctadiene terpolymer, polybutadiene, butadiene-acrylonitrile.

The process of the invention is further explained and described in connection with the following examples.

DESCRIPTION OF THE PREFERRED EMBODIMENTS

Example 1

In this example there were employed: carbon black with the following physical-chemical characteristic data:

| | | |
|---|---|---|
| electron microscopic particle diameter | nm | 27 |
| BET-surface area DIN 66132 | m$^2$/g | 80 |
| DBP-number according to ASTM D 2414 | ml/100 g | 130 |
| pH DIN 53200 | | 9.5 |
| Water content DIN 53198 | % | 1.0 |

Silica with the following physical-chemical characteristic data (ascertained after drying from filter cakes)

| | | |
|---|---|---|
| BET-surface area DIN 66132 | m$^2$/g | 150 |
| Conductivity 4.5% Dispersion | μ mho | 1000 |
| pH DIN 53200 | | 6.3 |
| Water content | % | 5.0 |

A thin liquid dispersion from the filter cake of this silica filler was produced by means of the process described in German Pat. No. 24 47 613 (and related U.S. Pat. No. 4,094,771). The solid content of this dispersion was 20 weight % and the pH 2.9.

There was used a horizontal pin containing screw granulator (pellet machine) which is equipped with a pin roll along the shaft for production of the mixed granulates. The total length of the pin containing screw granulator was 1,600 mm, the effective length 1,080 mm (from the point of injecting water or injecting dispersion up to the elimination from the pellet trough). The inner diameter of the pin containing screw granulator was 200 mm. The speed of rotation was adjusted to 750 rpm.

25 kg/h were continuously introduced into the pin containing screw granulator by means of a controllable screw, 65 kg/h of the silica dispersion sprayed on the carbon black and the pelleting carried out. The supply pressure at the spray nozzle was 8 bar. The wet pellets thus obtained were dried. The mixed granulate pellets had the following physical-chemical characteristic data.

| | | |
|---|---|---|
| DBP (dibutyl phthalate) number ASTM D 2414 | ml/100 g | 141 |
| pH DIN 53200 | | 6.0 |
| Bulk density DIN 53600 | g/l | 318 |
| Individual pellet hardness | | |
| 1.5 mm pellets | g | 13 |
| Ash content DIN 53586 | % | 34.5 |
| Sieve analysis of the pellets | | |
| >2.0 mm | % | 0.4 |
| 1.0–2.0 mm | % | 21.8 |
| 0.7–1.0 mm | % | 17.8 |
| 0.5–0.7 mm | % | 18.6 |
| 0.25–0.5 mm | % | 24.8 |
| 0.125–0.25 mm | % | 11.6 |
| <0.125 mm | % | 5.0 |

The mixed granulate pellets had an excellent pourability. The pellets are largely spherically shaped. They can be well worked into and dispersed in polymer mixtures.

The measurement of the hardness of the individual pellets is carried out as follows:

The pellet shaped granulates are sieved through two sieves with 1.4 and 1.6 mm clear width of mesh. The pellets remaining on the 1.4 mm sieve were again sieved on a 1.5 mm sieve. The pellets exactly sticking in the meshes which have a diameter of exactly 1.5 mm were used for the investigation of the hardness of the individual pellets. For this purpose these pellets were placed on the pan of an electronic balance and loaded with a feed of about 1 mm/min by a pressure pick-off. The electronic balance recorded the dead weight in a bar graph. In breaking the pellets there occurs a removal of the load, the pressure pick off is raised and the individual pellet hardness is read off the bar graph in grams. As the measured value there is used the average value of 20 measurements.

Example 2

There was used a carbon black with the physical-chemical characteristic data of Example 1.

As the silica dispersion there was used the dispersion of Example 1. There was used the pin containing screw granulator described in Example 1. The speed of rotation of the pin containing shaft was 750 rpm. 30 kg/h of carbon black were continuously introduced into the pin containing screw granulator with a regulatable screw. 60 kg/h of the silica dispersion were sprayed on the carbon black through a nozzle. The supply pressure at the spray box was 8 bar. After discharge of the wet pellets from the pelleting machine they were dried. The following test values were ascertained on the dried mixed granulate.

| | | |
|---|---|---|
| DBP-number ASTM D 2414 | ml/100 g | 131 |
| pH DIN 53200 | | 6.6 |
| Bulk density DIN 53600 | g/l | 404 |
| Individual pellet hardness | g | 19 |
| Ash content DIN 53586 | % | 34.5 |
| Sieve analysis of the pellets | | |

|  |  |  |
|---|---|---|
| >2 mm | % | 30.6 |
| 1.0–2.0 mm | % | 46.8 |
| 0.7–1.0 mm | % | 10.0 |
| 0.5–0.7 mm | % | 6.4 |
| 0.25–0.5 mm | % | 4.8 |
| 0.125–0.25 mm | % | 0.6 |
| <0.125 mm | % | 0.6 |

Example 3

In this example there was used a carbon black which was clearly coarser than the carbon black employed in Examples 1 and 2.

The carbon black used here has the following physical-chemical characteristic data:

|  |  |  |
|---|---|---|
| Electron microscopic particle diameter | nm | 45 |
| BET-surface area DIN 66132 | m²/g | 36 |
| DBP-number ASTM D2414 | ml/100 g | 122 |
| pH DIN 53200 |  | 8.5 |

The silica employed has the following physical-chemical characteristic data measured on the dry material

|  |  |  |
|---|---|---|
| BET-surface area DIN 66132 | m²/g | 150 |
| Conductivity of the 4.5% Dispersion in water | µ mho | 1000 |
| pH DIN 53200 |  | 6.3 |

There was produced a thin liquid dispersion with 20% solids content from the filter cake of this silica filler in the manner described in Example 1. There were continuously introduced 25 kg/h of carbon black into the pin containing screw granulator described in Example 1. 62 kg/h of the silica dispersion were sprayed on the carbon black and the pelleting carried out. The supply pressure at the spray box was 7 bar. The wet pellets thus attained were dried at 150° C. The mixed granulate pellets had the following physical-chemical characteristic data.

|  |  |  |
|---|---|---|
| Ash content DIN 53586 | % | 31.9 |
| pH-DIN 53200 |  | 5.9 |
| Bulk density DIN 53600 | g/l | 336 |
| Individual pellet hardness | g | 12.4 |
| Sieve analysis of the pellets |  |  |
| <2 mm | % | 8.0 |
| 1.0–2.0 mm | % | 24.5 |
| 0.7–1.0 mm | % | 38.0 |
| 0.5–0.7 mm | % | 15.0 |
| 0.25–0.5 mm | % | 8.0 |
| 0.125–0.25 mm | % | 4.5 |
| <0.125 mm | % | 2.0 |

Example 4

There was used the carbon black of Example 1. To obtain various mixing ratios of carbon black-silica filler there were employed dispersions with various solids content. For this purpose there was used the silica according to Example 1. The dispersions produced therefrom had the following properties

|  | Solids Content | pH-value |
|---|---|---|
| Dispersion 1 | 10.5 | 4.3 |
| Dispersion 2 | 15.6 | 3.1 |
| Dispersion 3 | 19.5 | 2.9 |
| Dispersion 4 | 25.0 | 2.5 |

25 kg/h of carbon black were dosed into the pin containing screw granulator through a screw according to Example 1. There was dosed in via a spray nozzle dispersion until good pellets were formed. With dispersion 1 there were needed 38.0 kg/h, with dispersion 2 there were needed 50.0 kg/h, with dispersion 3 there were needed 60.0 kg/h and with dispersion 4 there were needed 75.0 kg/h. The speed of rotation of the pin containing screw was 750 rpm.

It is easy to see that for the same amount of carbon black the larger must be the amount of dispersion added the higher the solids content of the dispersion. This is explained by the reduction in the water content of the dispersion. After drying of the mixed granulate pellets the following test values were established on the products produced:

| Starting Dispersion | Disp. 1 10.5% | Disp. 2 15.6% | Disp. 3 19.5% | Disp. 4 25% |
|---|---|---|---|---|
| DBP-number ml/100 g | 130 | 127 | 141 | 148 |
| pH | 6.9 | 7.0 | 5.0 | 5.4 |
| Bulk density g/l | 332 | 332 | 328 | 308 |
| Individual pellet hardness g | 16 | 17 | 16 | 25 |
| Ash content % | 13.6 | 23.6 | 32.1 | 42.5 |
| Sieve analysis of the pellets |  |  |  |  |
| 2 mm % | 10.0 | 26.6 | 10.0 | 15.0 |
| 1.0–2.0 mm % | 34.8 | 38.2 | 28.0 | 41.0 |
| 0.7–1.0 mm % | 14.6 | 12.6 | 20.4 | 17.0 |
| 0.5–0.7 mm % | 12.0 | 8.2 | 17.0 | 11.0 |
| 0.25–0.5 mm % | 15.8 | 8.0 | 15.6 | 10.4 |
| 0.125–0.25 mm % | 5.0 | 2.4 | 4.4 | 3.0 |
| 0.125 mm % | 7.8 | 4.0 | 4.6 | 2.6 |
|  | 100.0 | 100.0 | 100.0 | 100.0 |

All the mixed granulates had sphere shaped configuration and were predominantely pourable. They were readily dispersible in rubber mixtures.

From this example it can be concluded that by using silica dispersion with different solids content there can be produced a wide spectrum of the composition of mixed granulates from precipitated silica and carbon black.

Example 5

There was employed a carbon black with the following physical-chemical characteristic data:

|  |  |  |
|---|---|---|
| Electron microscopic particle diameter | nm | 27 |
| BET-surface area DIN 66132 | m²/g | 80 |
| DBP-number according to ASTM D 2414 | ml/100 g | 110 |
| pH DIN 53200 |  | 9.5 |
| Water content DIN 53198 | % | 1.0 |

As light filler there was used a sodium aluminum silicate have the following characteristic data

|  |  |  |
|---|---|---|
| Average particle size | µ | 4 |

-continued

| | | |
|---|---|---|
| pH DIN 53200 | | 11.5 |
| Bulk density DIN 53600 | g/l | 400 |

This sodium aluminum silicate on the one hand was employed as an aqueous dispersion with about 48% solids content without further additive (A) and on the other hand as a 48% dispersion with an addition of 1.5% of tallow alcohol (B) as a sedimentation retarder.

There were introduced 25 kg/h of carbon black continuously into the pin containing pellet granulator described in Example 1 and 77.5 kg/h of dispersion A were sprayed on the carbon black at a spraying pressure of 6.5 bar. The speed of rotation was 750 rpm.

The same experiment was carried out with dispersion B.

The wet pellets were dried.

The mixed granulates formed had a composition of 40% carbon black and 60% sodium aluminum silicate and had the following physical-chemical characteristic data:

| | Iodine adsorption according to DIN 53 582 mg/g | Ash content at 800° C. DIN 53586 % | pH DIN 53200 | Bulk density DIN 53600 g/l |
|---|---|---|---|---|
| Mixed granulate from Dispersion A | 31 | 55.4 | 11.0 | 500 |
| Mixed granulate from Dispersion B | 35 | 55.2 | 10.8 | 516 |

The mixed granulates exhibited an excellent pourability.

Example 6

There was used a carbon black with the following physical-chemical characteristic data:

| | | |
|---|---|---|
| Electron microscope particle diameter | nm | 50 |
| BET-surface area DIN 66132 | m$^2$/g | 30 |
| DBP-number according to ASTM D 2414 | ml/100 g | 92 |
| pH DIN 53200 | | 7.5 |
| Water content DIN 53 198 | % | 0.5 |

As natural filler there was used a natural aluminum silicate (clay) having the following characteristic data:

| | |
|---|---|
| Sieve residue according to DIN 53 580 43 μm sieve | 0.05 |
| average particle size μ | 2 |
| BET-surface area DIN 66132 | 30 |
| pH DIN 53200 | 5.5 |

There was produced from this silicate an aqueous dispersion having a solids content of 35%.

30 kg/h of carbon black were continuously introduced into the pin containing screw granulator described in Example 1 and with the standardized data of the pin containing granulator described there were continuously introduced 30 kg/h of carbon black. Here upon there were sprayed on 57 kg/h of the dispersion of the aluminum silicate wherein the spraying pressure at the nozzle was 7.5 bar. After discharge of the wet pellets these were dried. The following physical-chemical data were determined on the mixed granulate formed containing 60% carbon black and 40% aluminum silicate:

| | | |
|---|---|---|
| Ash content DIN 53586 | % | 36 |
| pH DIN 53200 | | 6.1 |
| Bulk density DIN 53600 | g/l | 476 |
| Individual pellet hardness 1.5 mm pellets | g | 20 |

Example 7

A mixed granulate produced according to Example 3 was employed in a rubber mixture.

The rubber mixture had the following composition:

| | Parts by Weight |
|---|---|
| Natural rubber SMR5, Defo 600 degraded with 0.2 Rhenacit | 80 |
| Polyisoprene rubber Cariflex i R 500 | 20 |
| Mixed granulate - as described - | 30 |
| Zinc oxide RS | 4 |
| Stearic acid | 1 |
| Vulcanox 4010 NA | 0.5 |
| Plasticizer oil Naftolen ZD (a naphthenic hydrocarbon) | 4 |
| Vulcanox HS | 1 |
| Vulcacit DZ | 0.8 |
| Diphenylguanidine | 0.4 |
| Sulfur | 2.5 |
| | 144.2 parts by weight |

Rhenacit=Plasticizer=Zinc salt of Pentachlorothiophenol

Vulkanox 4010 NA=Anti-ager=N'-isopropyl-N'-phenyl-p-phenylenediamine

Vulkanox HS=Anti-ager=Poly-2,2,4-trimethyl-1,2-dihydroquinoline

Vulkacit DZ=N-N-dicyclohexyl-2-benzothiazylsulfonamide

After a vulcanization at 145° C. there were obtained the following vulcanization data

| | | 17 Minutes Vulcanization | 34 Minutes Vulcanization |
|---|---|---|---|
| Tensile strength | mPa | 20.2 | 16.4 |
| Modulus | 100% mPa | 1.2 | 1.2 |
| | 200% mPa | 2.8 | 2.7 |
| | 300% mPa | 5.5 | 5.2 |
| Elongation at break | % | 630 | 570 |
| Tear propagation resistance | kp/cm$^2$ | 15 | 15 |
| Shock Elasticity DIN 53512 | | 66 | 60 |
| Shore A - hardness | | 50 | 49 |

From these test values in comparing the modulus values for 17 and 34 minutes vulcanization there can be seen an excellent reversion resistance. The high elongation at break and the good tear propagation show that the mixed granulates are particularly suited for the dynamically required rubber mixtures.

The entire disclosure of parent German application P 2910991.9-41 is hereby incorporated by reference.

The ratio of carbon black to light filler is not critical and can range for example from 20 to 900 parts of carbon black to 100 parts of light filler.

The mixed granulate can be used in the rubber compositions for example in an amount of 1 to 300 parts of total filler per 100 parts of the rubber. The light filler can be used for example in an amount of 1 to 250 parts and the carbon black in an amount of 0.1 to about 300 parts per 100 parts of rubber.

In the working examples there were used 67 to 640 parts of carbon per 100 parts of light filler. Also in the working examples the concentration of light filler in the dispersion ranged from 10.5 to 48%. However, the concentration can be varied outside this range.

What is claimed is:

1. In a process for the production of mixed granulates of carbon black and a light colored filler selected from the group consisting of silica, kaolinite, clay, silica chalk, chalk, natural zeolite, sodalite, synthetic zeolite, calcium silicate, aluminum silicate, and magnesium silicate by means of a pin containing screw granulator, the improvement comprising continuously supplying carbon black to the granulator and continuously spraying the light colored filler in the form of an aqueous dispersion on the carbon black in the granulator, simultaneously granulating this mixture and drying the granulated mixture so obtained.

2. The process of claim 1 wherein the light colored filler is precipitated silica.

3. The process of claim 1 wherein there are employed 67 to 640 parts of carbon per 100 parts of light colored filler.

4. The process of claim 3 wherein the light colored filler is employed in the dispersion at a concentration of 10.5 to 48% by weight of the dispersion.

5. The process of claim 1 wherein the light colored filler is employed in the dispersion at a concentration of 10.5 to 48% by weight of the dispersion.

* * * * *